United States Patent
Jindal et al.

(10) Patent No.: US 9,825,752 B2
(45) Date of Patent: Nov. 21, 2017

(54) IN-BAND FULL-DUPLEX OPERATION

(71) Applicant: Avago Technologies General IP (Singapore) Pte. Ltd., Singapore (SG)

(72) Inventors: Nihar Jindal, Mountain View, CA (US); Murat Mese, Rancho Palos Verdes, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 148 days.

(21) Appl. No.: 14/553,550

(22) Filed: Nov. 25, 2014

(65) Prior Publication Data

US 2016/0127108 A1 May 5, 2016

Related U.S. Application Data

(60) Provisional application No. 62/073,645, filed on Oct. 31, 2014.

(51) Int. Cl.
| | |
|---|---|
| *G06F 11/00* | (2006.01) |
| *H04L 5/14* | (2006.01) |
| *H04W 72/04* | (2009.01) |
| *H04W 72/12* | (2009.01) |

(52) U.S. Cl.
CPC ........... *H04L 5/14* (2013.01); *H04W 72/0453* (2013.01); *H04W 72/1226* (2013.01); *H04W 72/1242* (2013.01)

(58) Field of Classification Search
CPC .... H04L 1/0026; H04L 1/0073; H04W 28/04; H04W 28/044; H04W 28/046; H04W 28/048; H04W 74/085; H04W 74/0858
See application file for complete search history.

(56) References Cited

U.S. PATENT DOCUMENTS

| | | | | |
|---|---|---|---|---|
| 9,451,524 | B2* | 9/2016 | Heninwolf | H04W 40/02 |
| 2013/0114468 | A1* | 5/2013 | Hui | H01Q 3/2611 |
| | | | | 370/277 |
| 2013/0315109 | A1* | 11/2013 | Raaf | H04B 7/15528 |
| | | | | 370/277 |
| 2014/0198691 | A1* | 7/2014 | Oberhammer | H04B 15/00 |
| | | | | 370/281 |

* cited by examiner

Primary Examiner — Alvin Zhu
(74) Attorney, Agent, or Firm — Foley & Lardner LLP

(57) ABSTRACT

In some aspects, the disclosure is directed to methods and systems for in-band full-duplex operation. A first device transmits a frame to a second device wirelessly within a first frequency band, in one or more embodiments. In one or more embodiments, the first device detects, while the transmission of the frame is ongoing, feedback from the second device within the first frequency band. In one or more embodiments, the feedback is in response to the ongoing transmission of the frame. In one or more embodiments, the first device determines, responsive to the feedback, whether to stop the ongoing transmission of the frame or to update a transmission parameter for the ongoing transmission within the first frequency band.

20 Claims, 7 Drawing Sheets

IN-BAND FULL-DUPLEX OPERATION

RELATED APPLICATIONS

This application claims priority to and the benefit of U.S. Provisional Patent Application No. 62/073,645, filed Oct. 31, 2014, the entire contents of which are incorporated herein by reference in their entirety for all purposes.

FIELD OF THE DISCLOSURE

This disclosure generally relates to systems and methods for managing transmission links of a communications system, including but not limited to systems and methods for full-duplex operation.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication is able to operate in accordance with various standards such as IEEE 802.11x Bluetooth, global system for mobile communications (GSM), code division multiple access (CDMA). As increased data throughput and other developments occur, updates and new standards are constantly being developed fir adoption, such those associated with the third generation partnership project (3GPP) and IEEE 802.11.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following standard(s) and specification(s), including any draft versions of such standard(s) and specification(s), are hereby incorporated herein by reference in their entirety and are made part of the present disclosure for all purposes: Long-Term Evolution (LTE); LTE-Advanced (LTE-A); 3GPP; and IEEE 802.11. Although this disclosure sometimes reference aspects of these standard(s) and specification(s), the disclosure is in no way limited to these aspects.

For purposes of reading the description of the various embodiments below, the following descriptions of the sections of the specification and their respective contents could be helpful:

Section A describes a network environment and computing environment which could be useful for practicing embodiments described herein; and Section B describes embodiments of systems and methods in-band full-duplex operation.

A. Computing and Network Environment

Figure 1A:
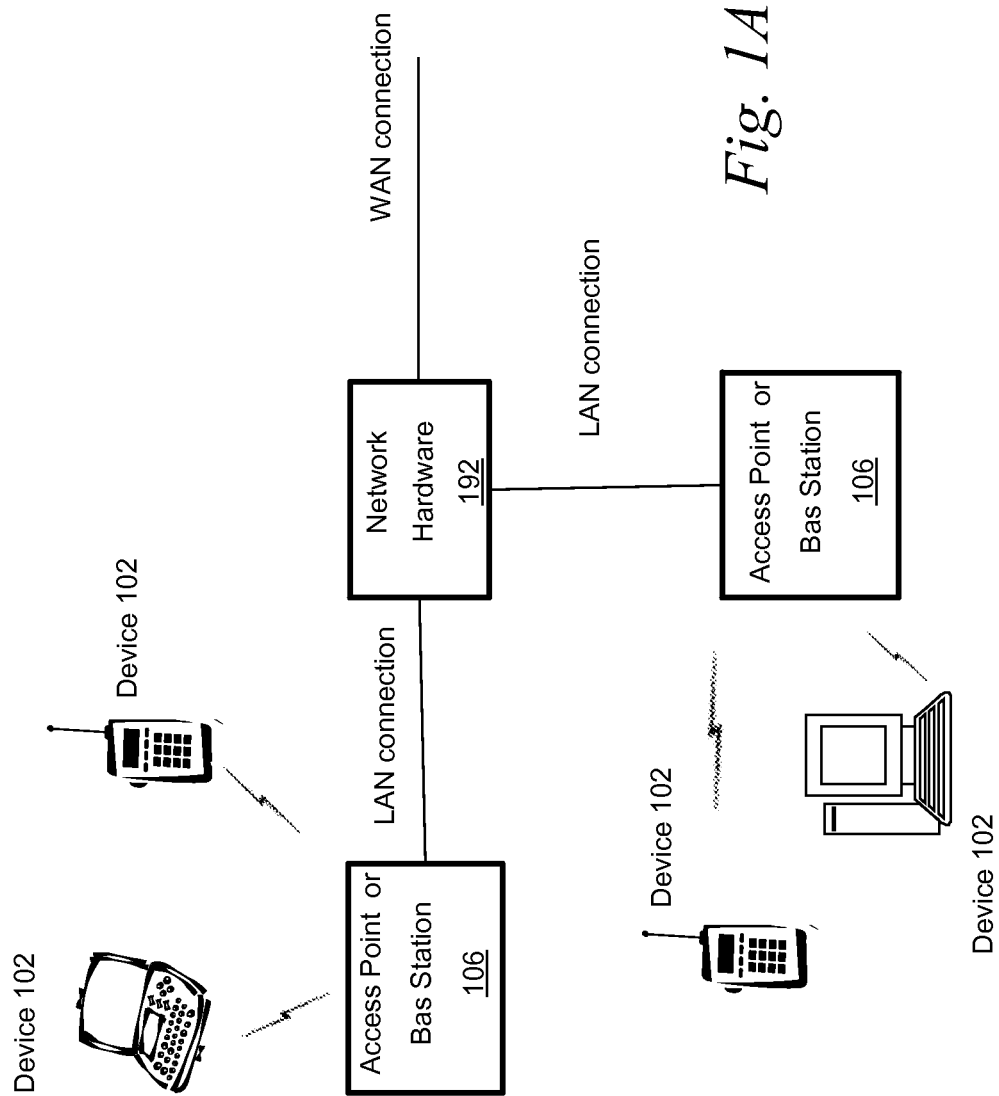
FIG. 1A is a block diagram depicting an embodiment of a network environment including one or more wireless communication devices in communication with one or more devices or stations.

Prior to discussing specific embodiments of the present solution, aspects of the operating environment as well as associated system components (e.g., hardware elements) are described in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 sometimes for example include laptop computers 102, tablets 102, personal computers 102 and/or cellular telephone devices 102. The details of an embodiment of each wireless communication device and/or base station are described in greater detail with reference to FIGS. 1B and 1C. The network environment is an ad hoc network environment, an infrastructure wireless network environment, a subnet environment, etc., in one or more embodiments.

Terms such as "wireless communication device", "user equipment," "mobile station," "mobile," "mobile device," "subscriber station," "subscriber equipment," "access terminal," "terminal," "handset," and similar terminology, sometimes refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station", "Node B." "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaining, or substantially any data-stream or signaling-stream from a set of wireless devices.

Referring again to FIG. 1A, the base stations 106 is operably coupled to the network hardware 192 via local area network connections in one or more embodiments. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a single-user multiple input multiple output—SU-MIMO or multiple-user multiple input multiple output—MU-MIMO, configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), such as in a cellular network. A base station 106 can connect to a router (e.g., via a wired network) as a standalone device in some embodiments. In other embodiments, a base station can be a component of a router. A base station 106 can provide multiple devices 102 access to a network. A base station 106 can, for example, connect to a wired Ethernet connection and provide wireless connections using radio frequency links for other devices 102 to utilize that wired connection. A base station 106 can be built and/or implemented to support a standard for sending and receiving data using one or more radio frequencies. Those standards and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
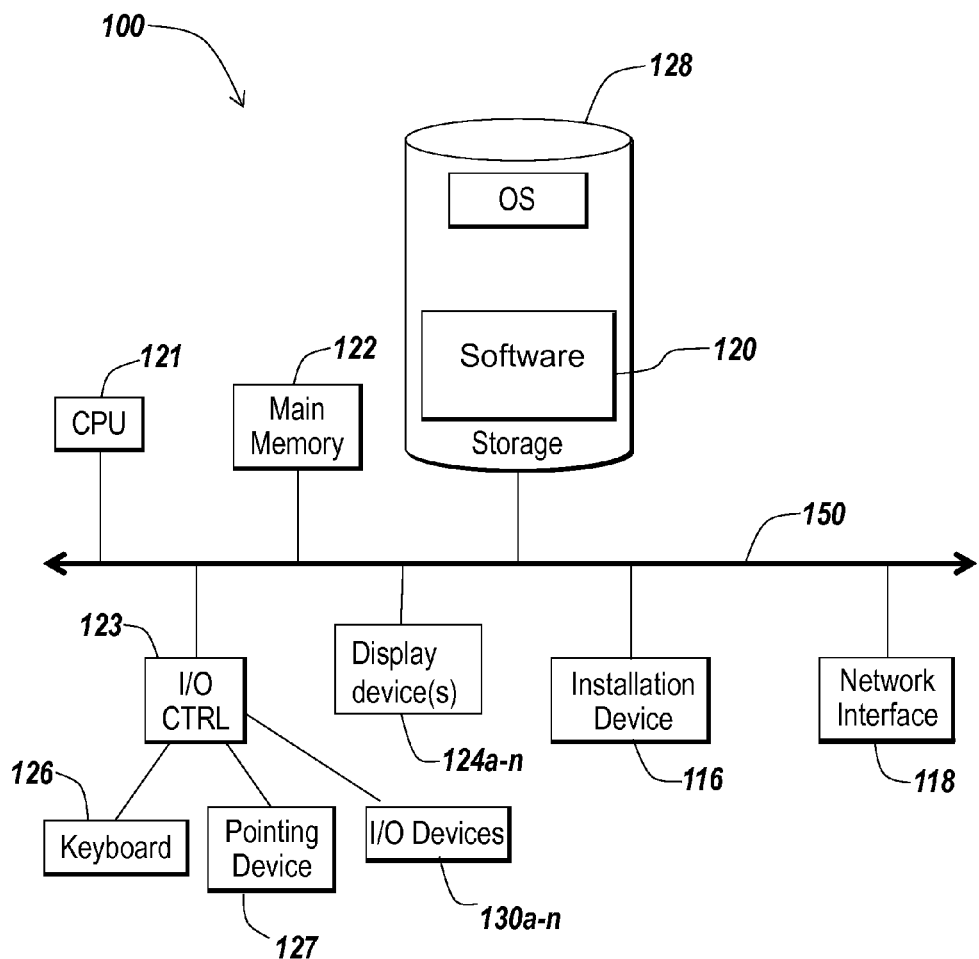
FIGS. 1B and 1C are block diagrams depicting embodiments of computing devices useful in connection with the methods and systems described herein.
Figure 1C:
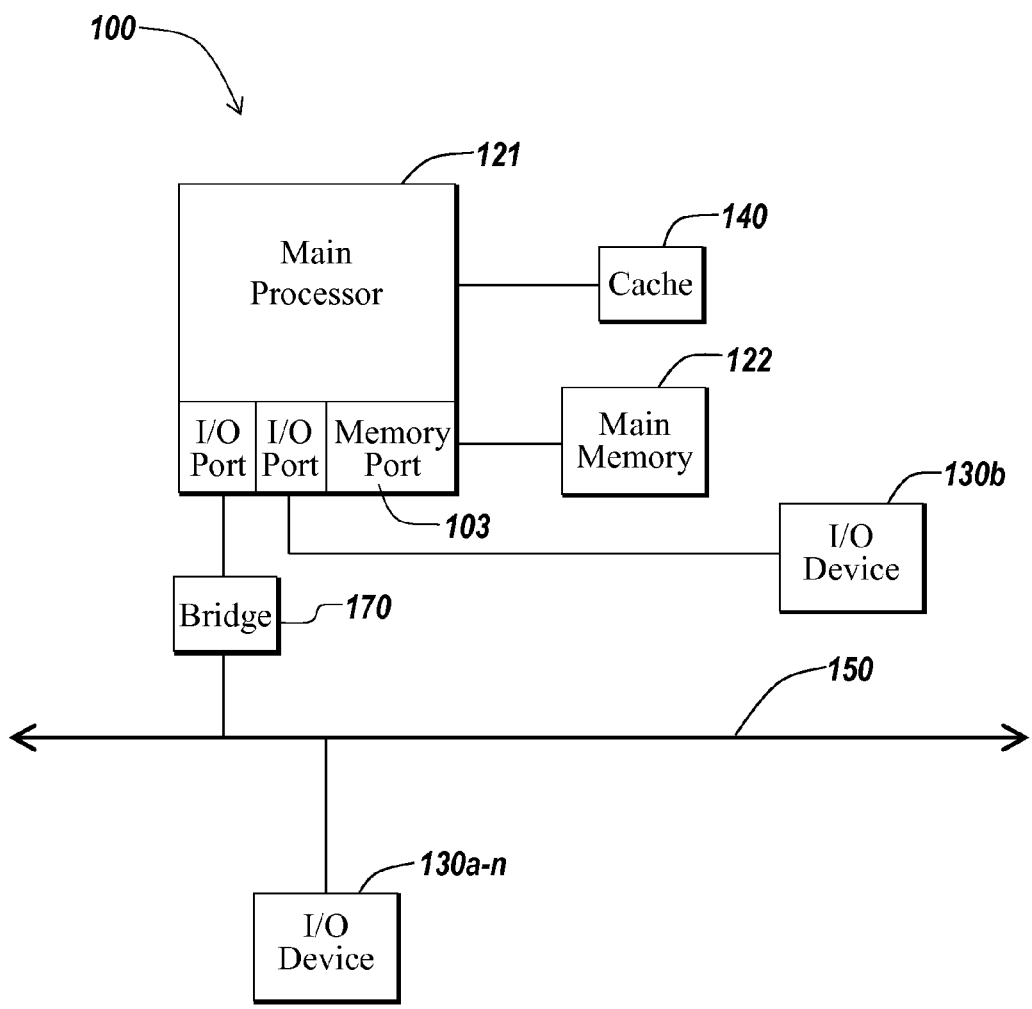

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130a-n via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 131 directly.

A wide variety of I/O devices 130a-n and 131 can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices 130*a-n* can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124*a*-124*n*. As such, any of the I/O devices 130*a*-130*n* and/or the I/O controller 123 can include any type and/or form of suitable hardware, software, or combination of hardware and software to support, enable or provide for the connection and use of the display device(s) 124*a*-124*n* by the computing device 100. For example, the computing device 100 can include any type and/or form of video adapter, video card, driver, and/or library to interface, communicate, connect or otherwise use the display device(s) 124*a*-124*n*. In one embodiment, a video adapter can include multiple connectors to interface to the display device(s) 124*a*-124*n*. In other embodiments, the computing device 100 can include multiple video adapters, with each video adapter connected to the display device(s) 124*a*-124*n*. In some embodiments, any portion of the operating system of the computing device 100 can be implemented for using multiple displays 124*a*-124*n*. One ordinarily skilled in the art will recognize and appreciate the various ways and embodiments that a computing device 100 can be implemented to have one or more display devices 124*a*-124*n*.

In further embodiments, an I/O device 130*a-n* can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, sensor, desktop computer, laptop or notebook computer, server, handheld computer, mobile telephone, or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. In-Band Full-Duplex Operation

Described herein are systems and methods for in-band full-duplex operation. In-band full-duplex operation enables simultaneous transmission (TX) and reception (RX) in the same frequency band, in one or more embodiments. On the other hand, half-duplex operation provides for either transmit or receive in a band, but not both, in one or more embodiments. For example, time division duplex (TDD) systems switch between transmitting and receiving, and frequency division duplex (FDD) systems have the capability to simultaneously transmit and receive, using different frequency bands for transmit and for receive, in one or more embodiments. In one or more embodiments, in-band full-duplex operation increases system or communications capacity, effectively doubling available bandwidth, and therefore potentially doubles the available transmission throughput. With respect to TDD systems, the gain is potentially even larger under full-duplex operation, because half-duplex constraint leads to many system inefficiencies, such as at the media access control (MAC) level in one or more embodiments. For example, and in one or more embodiments, a half-duplex TDD system (such as WLAN) provides a relatively low aggregate throughput when congested, but with full duplex operation, the system potentially avoids congestion and results in a throughput gain that is potentially considerably larger than two-fold.

In one or more embodiments, under in-band full-duplex operation, a device's transmitted signal sometimes leaks into the device's receiver circuit (sometimes referred to as "self-interference"). In one or more embodiments, the signal leakage is at a level that is substantially higher than a received signal-of-interest (e.g., 100 dB stronger). In one or more embodiments, the self-interference is known to or understood by the device, because the leakage signal is based on signals generated and/or transmitted by the device. The use of self-interference cancellation, based on advances in self-interference cancellation in radio frequency and digital domains, makes in-band operation a viable communication solution in one or more embodiments. In one or more aspects, this disclosure describes some system design implications and solutions for full-duplex capable devices. For example, under full duplex operation, a device (e.g., 802.11 or LTE device) has the capability to receive and transmit at the same time, and therefore can be designed and/or implemented to provide real time feedback while receiving a transmission from another device, in one or more embodiments. In one or more embodiments, real time feedback allows for dynamic adjustment of transmission parameters based on the feedback. Thus, in one or more embodiments, the use of real time feedback optionally or potentially allows for a more aggressive initial modulation and coding scheme (MCS) to be applied in a transmission for example.

In one or more embodiments, real time feedback allows devices to address collision or transmission priority. In one or more embodiments, such feedback is in the form of a confirmation message to indicate that the receiving device is able to successfully decode the received transmission, and used as a mechanism to address transmission collisions. In one or more embodiments, the feedback is implemented to inform a transmission source device to back off its transmission in favor of a higher priority transmission detected within the same frequency band. In one or more embodiments, to support or facilitate in-band full duplex operation, the devices operate according to rules or protocol changes that coordinate transmissions across the devices. For example, in one or more embodiments, the frame durations of transmit and receive channels are coordinated. In one or more embodiments, one link/channel operates at a reduced power relative to another to reduce self-interference for instance. In one or more embodiments, one or more devices are implemented for frequency-symmetric scheduling to efficiently utilize the band under full duplex operation. One or more of the devices optionally learn or receive information about the characteristics of various links to adaptively reduce interference between links, in one or more embodiments.

In one or more aspects, the disclosure is directed to embodiments of a method for in-band full-duplex operation. The method includes transmitting, by a first device, a frame to a second device wirelessly within a first frequency band in one or more embodiments. In one or more embodiments, the first device detects, while the transmission of the frame is ongoing, feedback from the second device within the first frequency band. In one or more embodiments, the feedback is in response to the ongoing transmission of the frame. In one or more embodiments, the first device determines, responsive to the feedback, whether to stop the ongoing transmission of the frame or to update a transmission parameter for the ongoing transmission within the first frequency band.

In one or more embodiments, the transmission of the frame and transmission of the feedback both use an 802.11 or a LTE protocol. In one or more embodiments, the first device detects a transmission from a third device, and determines to stop, delay or modify the transmission of the frame based on the detection of the transmission from the third device. In one or more embodiments, the first device detects a transmission from a third device, and determines whether to maintain, stop, delay or modify the transmission of the frame based on a priority of the transmission from the third device. In one or more embodiments, the first device determines the priority based on at least one or more of: content, message length, duration, a most recent transmission, or battery status associated with the transmission from the third device. In one or more embodiments, the feedback includes a sample of the transmission, or includes information based on a log likelihood ratio (LLR) or decoded bits from the transmission. In one or more embodiments, the first device updates at least one or more of a MCS, code rate, code type, power, beamforming configuration, number of spatial streams, bandwidth, or sub-band allocation of the transmission responsive to the feedback.

In one or more aspects, the disclosure is directed to embodiments of a method for in-band full-duplex operation. The method includes receiving, by a first device, a frame from a second device transmitted wirelessly within a first frequency band, in one or more embodiments. In one or more embodiments, the first device sends, while the transmission of the frame is ongoing, feedback to the second device within the first frequency band. In one or more embodiments, the feedback is in response to the ongoing transmission of the frame. In one or more embodiments, the feedback includes information indicating whether to stop the ongoing transmission of the frame or to update a transmission parameter for the ongoing transmission within the first frequency band.

In one or more embodiments, the first device detects, while the transmission is ongoing, a transmission from a third device within the first frequency band, and sends the feedback based on the detected transmission from the third device. In one or more embodiments, the first device is one of a wireless local area network (WLAN) device or a LTE device, and the second device is the other of the WLAN device or the LTE device. In one or more embodiments, the first device decodes a preamble of the frame while the transmission is ongoing, and determining whether to send the feedback based on the decoding. In one or more embodiments, the first device sends feedback to the second device at regular intervals while the transmission of the frame is ongoing. In one or more embodiments, the feedback includes a message transmitted to one or more devices, the message identifying at least one of the one or more devices to stop transmission.

In one or more aspects, the disclosure is directed to embodiments of a system for in-band full-duplex operation. The system includes a transmitter of a first device, the transmitter implemented to wirelessly transmit a frame to a second device within a first frequency band in one or more embodiments. In one or more embodiments, a detector of the first device detects, while the transmission of the frame is ongoing, feedback from the second device within the first frequency band, the feedback in response to the ongoing transmission of the frame. In one or more embodiments, a control module of the first device determines, responsive to the feedback, whether to modify or suspend the ongoing transmission of the frame within the first frequency band.

In one or more embodiments, the transmitter transmits the frame using an 802.11 or a LTE protocol. In one or more embodiments, the control module stops, delays or modifies the transmission of the frame based on detection of a transmission from a third device. In one or more embodiments, the control module determines whether to maintain, stop, delay or modify the transmission of the frame based on a priority of a detected transmission from a third device. In one or more embodiments, the detector determines the priority based on at least one or more of: content, message length, duration, a most recent transmission of the third device, or battery status associated with the transmission from the third device. In one or more embodiments, the detector detects that the feedback includes a sample of the transmission, or includes information based on a LLR or decoded bits from the transmission. In one or more embodiments, the control module updates at least one or more of a MCS, code rate, code type, power, beamforming configuration, number of spatial streams, bandwidth, or sub-band allocation of the transmission responsive to the feedback.

Figure 2A:
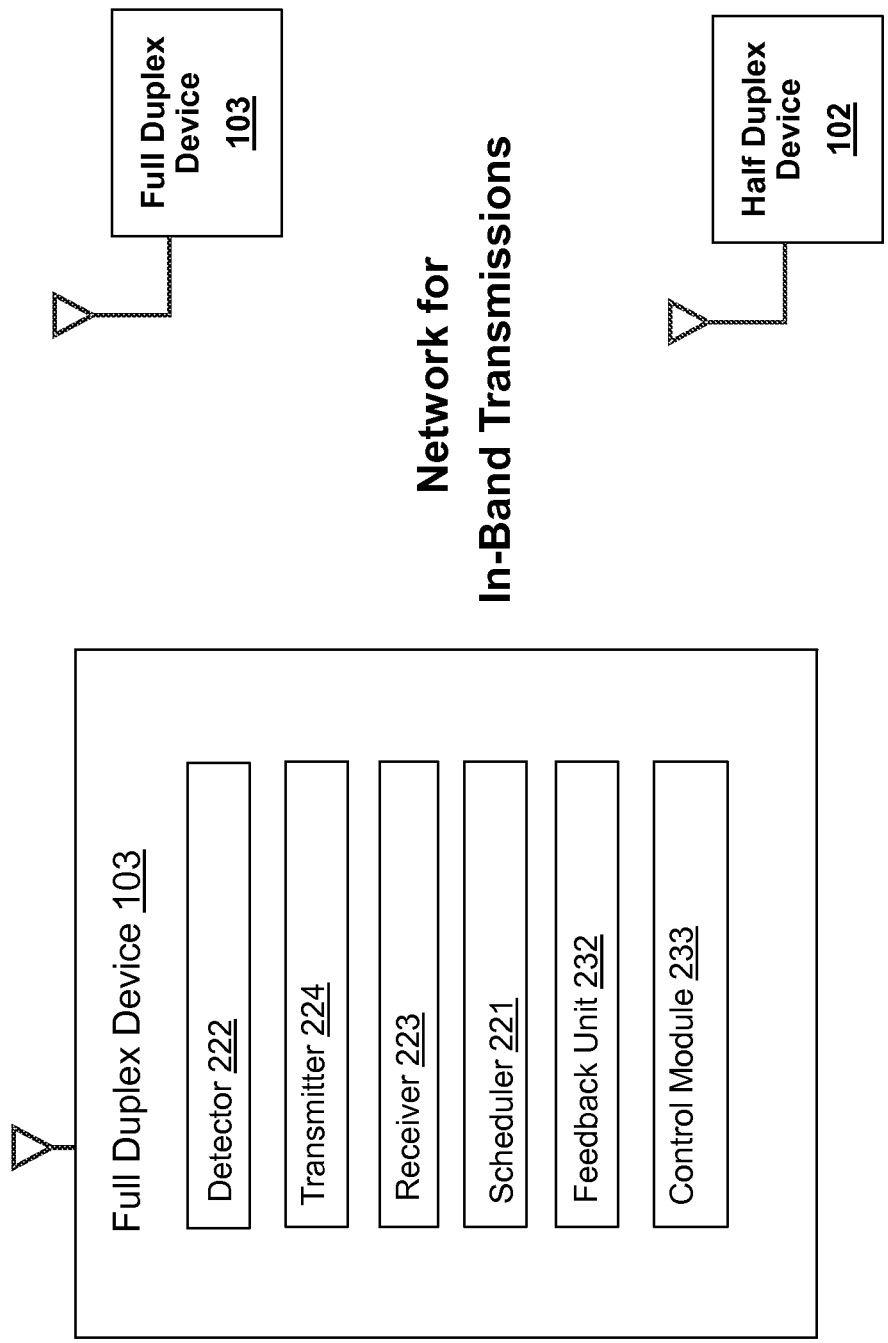
FIG. 2A is a block diagram depicting an embodiment of a system for in-band full-duplex operation.

Referring to FIG. 2A, one or more embodiments of a system for in-band full-duplex operation is depicted. In brief overview, the system includes, in one or more embodiments, a device 103 operating within a frequency band of a WLAN environment that includes one or more WLAN devices 102. The device 103 includes one or more of: a detector 222, a transmitter 224, a receiver 223, a scheduler 221, a feedback unit 232, or a control module 233, in one or more embodiments. In various embodiments, one or more of these elements or modules is combined into fewer elements, or includes one or more submodules. Each of these elements, modules and/or submodules is implemented in hardware, or a combination of hardware and software, in one or more embodiments. For instance, each of these elements, modules and/or submodules optionally or potentially includes one or more applications, programs, libraries, scripts, tasks, services, processes or any type and form of executable instructions executing on hardware of the device 103, in one or more embodiments. The hardware includes one or more of circuitry and/or a processor, for example, as described above in connection with at least 1B and 1C, in one or more embodiments.

Although certain portions of the disclosure refer to LTE and/or WLAN (or 802.11) communications and devices, such as licensed-assisted access (LLA) LTE or 802.11 ax, these references are merely for illustration and not intended to be limiting in any way. For example, in-band full-duplex and/or half-duplex operation could occur and/or co-exist between any type of devices, between devices using different communications protocols, between devices using differing modulation techniques and/or having differing capabilities, and/or include communications between a device capable of communicating in a full-duplex protocol with another device communicating in a half-duplex protocol.

Figure 2B:
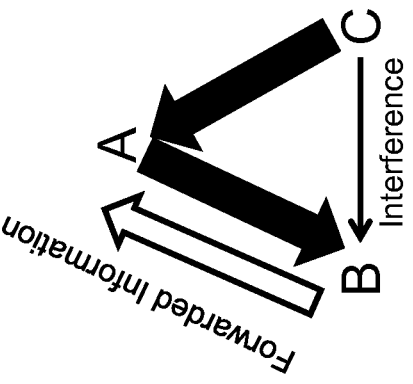
FIG. 2B is a schematic diagram of embodiments of in-band operation.
Figure 2B:
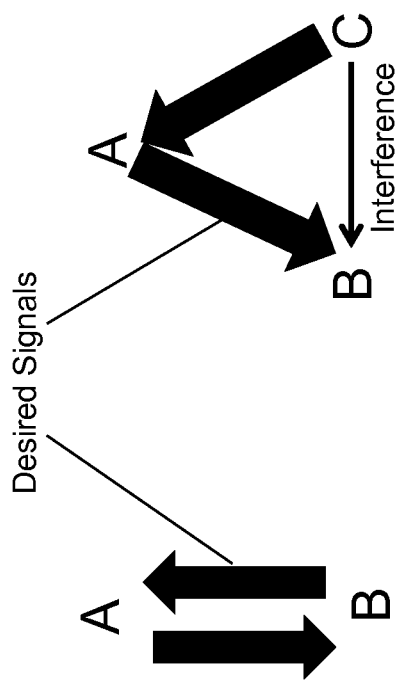

Referring again to FIG. 2A, in one or more embodiments, the device 103 includes a transmitter 224 and/or a receiver 223 designed, built and/or implemented to respectively transmit and receive any type or form of messages or frames within a first frequency band or across different frequency bands. In one or more embodiments, the transmitter 224 and receiver 223 operate in full-duplex (e.g., within a first frequency band) and/or half-duplex modes, in communication with another device 103, 102. In one or more embodiments, uplink and downlink transmissions of devices in a system are scheduled independently. In one or more embodiments, uplink and downlink transmissions of devices 103, 102 in a system are tightly coupled or coordinated to increase system capacity, for example if some of the devices 103, 102 are full-duplex capable. Referring to FIG. 2B, for example, schematic diagrams of embodiments of in-band operation is depicted. In-band full-duplex operation on the same frequency band is sometimes considered ideal when device A is transmitting to device B and device B is transmitting to device A, in one or more embodiments. In this scenario, as illustrated in Case 1 of FIG. 2B, device A receives interference from its own transmission, and device B receives interference from its own transmission, in one or more embodiments. Thus, devices A and B each performs self-interference cancellation (e.g., based on knowledge of each device's own transmission), so that each device is able to simultaneously transmit and receive in one or more embodiments. This configuration potentially doubles the capacity of the system, by allowing simultaneous or concurrent bi-directional communication on the same spectrum (same frequency band), in one or more embodiments.

Referring now to Case 2 of FIG. 2B, device A performs self-interference cancellation since it is the source of its own interference, in one or more embodiments. Device B is however interfered with by device C's transmission, which is unknown to device B in one or more embodiments. There are solutions for device B to reduce the effect of the interference from device C, which for example potentially involves additional antennas at device B, spatial beamforming, and/or messaging (e.g., at the expense of overhead) between device, in one or more embodiments. Some of these solutions do not completely eliminate the interference at device B, so Case 1 is sometimes preferred over Case 2 in one or more embodiments. Frequency symmetric scheduling is a scheduling method to make full or efficient use of the frequency band(s) in Case 1, in one or more embodiments. The term "symmetric" refers to matching uplink and downlink frequency-domain scheduling, in one or more embodiments.

Figure 2C:
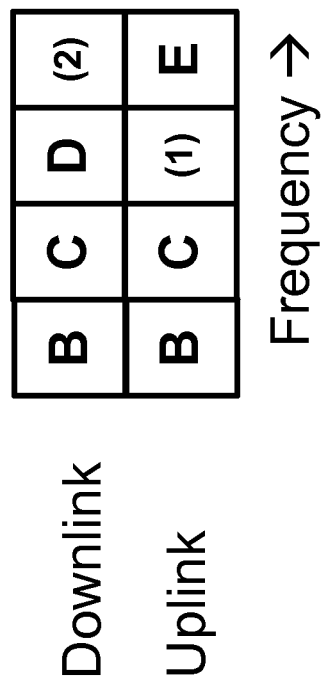
FIG. 2C is a schematic diagram of another embodiment of in-band operation.

Referring now to FIG. 2C, a schematic diagram of one embodiment of in-band operation is depicted. The schematic diagram illustrates frequency symmetric scheduling for in-band full-duplex devices as well as half-duplex devices, in one or more embodiments. In one or more embodiments, device A is an access point or base station, and devices B, C, D and E are devices in communication with device A, for example. Devices A, B and C are full duplex capable, and devices D and E are not, in one or more embodiments. In order to effectively utilize full-duplex capability among the devices, device A schedules device B on a first frequency band for downlink and uplink transmissions. A similarly schedules device C on a second frequency band for downlink and uplink transmissions in one or more embodiments. In one or more embodiments, A schedules unidirectional transmission for non-full duplex devices, e.g., the third frequency band is assigned for downlink transmission to device D and channel component (1) is left unassigned, while the fourth band is assigned for uplink transmission from device E and channel component (2) is left unassigned. In one or more embodiments, if device D is capable of interference cancellation, it is possible to assign a device other than device D to transmit using channel component (1). Similarly, if device E is capable of interference cancellation, device A can perform a simultaneous downlink transmission to a device other than device E utilizing channel component (2).

In in-band full-duplex operation, two devices 103 maintain a bi-directional link using a common spectrum (frequency band) in both directions in one or more embodiments. Using the bi-directional link (in which a device A transmits to a device B, and device B transmits to device A), one or both of devices A and B perform self-interference cancellation in one or more embodiments. Referring now to Case 2 of FIG. 2B, for instance, if device C rather than device B transmits to device A as illustrated, device A is able to perform self-interference cancellation in one or more embodiments. However, device B cannot perform cancellation of the interference from C (e.g., because the interference from device C cannot be easily characterized at device B by device B), in one or more embodiments. Thus, in one or more embodiments, restricting full-duplex to only bi-directional links potentially lowers system capacity when traffic is not symmetric.

In one or more embodiments, this disclosure provides solutions for cancellation of interference for the case of full-duplex operation with asymmetric transmissions. These solutions enable interference cancellation in in-band full-duplex operation in one or more embodiments. By way of illustration, and in one or more embodiments, device A transmits to device B, while device C simultaneously transmits to device A (e.g., on same frequency band). Device A performs self-interference cancellation, so that A is able to transmit and receive simultaneously (with no or reduced interference from device A's transmissions). Device B receives a desired signal from device A, and also interference from device C in one or more embodiments. B performs interference cancellation on the C-to-B signal by using spatial cancellation, and/or physical antenna steering/reconfiguration/selection, in one or more embodiments. For instance, device B learns the spatial signature of the C-to-B link, and designs receive vectors that null or reduce the interference power from device C in one or more embodiments. In one or more embodiments, device C selects transmit beamforming vectors, or an antenna configuration, such that the interference imparted to device B is reduced or substantially eliminated. In one or more embodiments, device A learns from the channels (e.g., B-to-C, possibly also A-to-B and C-to-A) and designs transmit beamforming vectors for the A-to-B link and C-to-A link, such that device B is able to achieve a high signal-to-interference-plus-noise ratio (SINR). In one or more embodiments, device B selects an antenna (or an antenna subset) that is implemented and/or designed to receive minimal interference from device C.

In one or more aspects, this disclosure describes device-assisted uplink detection via in-band full-duplex operation. This increases the system and/or throughput capacity even further for in-band full-duplex systems beyond bi-directional links while using the same spectrum in both directions, in one or more embodiments. This solution uses or shares information of observed interference in a full duplex system, in one or more embodiments. For example, not only does device B attempt to cancel the interference from the C-to-B link, device B is able to extract information (from the C-to-B signal) on C's transmission, and potentially forward that information to device A (e.g., as shown in Case 3 of FIG. 2B), to assist device A in decoding device C's transmission in one or more embodiments.

In one or more embodiments, device B provides macro-diversity to device A, e.g., effectively provides (or lends) one or more additional antenna(s) to device A for decoding the C-to-A transmission. For example, and in one or more embodiments, the link to carry this forwarded information is in-band, e.g., using the same frequency as the other two desired transmissions, or alternatively on a separate band. In one or more embodiments, device B is able to forward (via the link) device B's received samples to device A. Device A knows what it transmitted to device B, and so can remove that part of the signal from samples received from B, in one or more embodiments. The remaining portion is the C-to-B signal, from which device A is able to obtain extra information on device C's transmission, in one or more embodiments. In one or more embodiments, device B jointly decodes the A-to-B and C-to-B transmissions, and includes LLR information on device C's transmission in the information forwarded to device A. The LLR information is input into, or utilized by device A's decoder in one or more embodiments (e.g., for decoding the C-to-A transmission). In one or more embodiments, device B performs receive filtering to (spatially) separate the A-to-B and C-to-B transmissions. In one or more embodiments, device B forwards (e.g., only) the samples corresponding to the C-to-B transmission or link to device A. These are merely some of the techniques for supporting full-duplex operation, and any two or more of the techniques described in this disclosure are combinable in one or more embodiments of the present systems and methods.

In one or more embodiments, the present systems and methods leverage on in-band full-duplex for efficient and/or effective collision avoidance and/or detection. In one or more embodiments, collisions are fundamentally difficult to avoid in half duplex systems, because when a device is transmitting, the device is not capable of listening for other simultaneous transmissions or feedback from an intended receiver. With full duplex, a transmitting device 103 is able to receive while it is transmitting a packet or message, in one or more embodiments. The transmitting device 103 is capable of listening for another simultaneous transmission on the air, e.g., a collision, in one or more embodiments. The transmitting device 103 is capable of listening for feedback from an intended receiving device 103, in one or more embodiments. Therefore, when applied to various types of devices, a transmitting device 103 is able to listen for simultaneous transmission and operate according to a protocol for coexistence of different types of devices (e.g., LLA LTE and WLAN devices sharing the same frequency band), or to make one type of devices (e.g., WLAN devices) operate more efficiently and more competitively with another type (e.g., LLA LTE devices), in one or more embodiments.

By way of illustration, and in one or more embodiments, a receiving device 103 transmits (e.g., via the transmitter 224) feedback, which includes a confirmation message, to a transmitting device 103 with an ongoing transmission. In one or more embodiments, the device 103 includes a feedback unit 232, implemented to provide or share feedback or other information (e.g., via a confirmation message, collision message, channel/transmission information, interference information, samples of received transmission) to another device 103. In one or more embodiments, the feedback unit 232 of the receiving device 103 transmits the feedback or a confirmation message after successfully decoding a preamble from the ongoing transmission. For example, the receiving device 103 detects and/or decodes the beginning of the transmission, e.g., the first 20 milliseconds of the transmission, which include the preamble or a portion of the preamble, to determine whether a successful decode has been performed.

Referring again to FIG. 2A, and in one or more embodiments, the device 103 includes a detector 222 implemented to detect a preamble of a transmission, detect additional transmission(s) in the frequency band, and/or to detect a collision. In one or more embodiments, the detector 222 interoperates with the feedback unit 232 to produce an appropriate feedback to another device (e.g., the transmitting device 103). In one or more embodiments, the transmitting device 103 includes a scheduler 221 configured to determine a time to begin a transmission, stop/delay/hold the transmission, determine a frequency band for a transmission (e.g., forwarding interference/channel information, a capabilities announcement, a collision message)) and/or determine a time to continue the transmission or to restart the transmission. In one or more embodiments, the scheduler 221 of the transmitting device 103 stops, delays or holds its transmission unless or until the transmitting device 103 receives the confirmation message or feedback.

In one or more embodiments, the confirmation message is not sent if the receiving device 103 detects a collision. In one or more embodiments, the confirmation message is not sent if the receiving device 103 is unable to decode the preamble (e.g., due to high interference from self-interference and/or another transmission, for instance, from a third or hidden node). In one or more embodiments, the receiving device 103 sends a confirmation message periodically during the frame or transmission, e.g., at intervals of each millisecond. Alternatively, and in one or more embodiments, the feedback unit 232 of the receiving device 103 opportunistically sends a "stop/delay/hold" message (sometimes referred to as a collision message) with respect to the transmission if the receiving device 103 detects or encounters (via the detector 222) an unsuccessful decoding during the transmission.

In one or more embodiments, the feedback unit 232 conveys or relays collision detection information to other devices or nodes after the packet transmission which is being affected, and/or which is affecting another transmission, ends. In one or more embodiments, the feedback unit 232 is implemented to mitigate or reduce possible collision(s) during the transmission of packet(s) or frame(s). In one or more embodiments, whenever a receiver device 103 (e.g., an access point, intended receiver) detects a collision (e.g., simultaneous reception of multiple packets), the feedback unit 232 transmits or broadcasts a special collision message. In one or more embodiments, a protocol could be implemented so that all devices currently transmitting to the sender of the collision message, end their transmission(s). In one or more embodiments, the collision message specifies or identifies the device(s) that are to end/postpone/delay/hold transmission (e.g., to allow one transmission, such as a transmission with the most power or priority, to continue or proceed without interference). In one or more embodiments, this enables collisions to be resolved quickly, instead of having collisions to be unresolved until the end of the frame transmission (e.g., when no ACK is received). In one or more embodiments, this mechanism is enabled or disabled based at least in part on network load (e.g., the mechanism is disabled when the network is not busy).

In one or more embodiments, the feedback unit 232 sends feedback to perform collision avoidance based on priority and/or quality of service (QoS) accorded to certain packets or frames. In some other embodiments, all packets or frames are treated equally for collision detection and mitigation. In one or more embodiments, a transmitting device 103 continues to receive messages while maintaining a transmission. In one or more embodiments, if during the transmission, the current transmitting device 103 decodes a packet from another transmission (e.g., not from a device intended to receive the transmitting device's transmission), a control module 233 and/or scheduler 221 of the transmitting device 103 determines to end, delay, or modify (e.g., reduce power) the current transmission.

In one or more embodiments, the control module of a device 103 is designed and/or implemented to modify one or more transmission parameters of the host device 103, for example, based on received feedback, detection of an additional transmission on the air, and/or results from decoding a received transmission. In one or more embodiments, a protocol assigns different priorities to different transmissions, e.g., control messages have top or preferred priority. If the transmitting device 103 decodes a preamble of another frame or transmission with a higher priority, the control module 233 and/or scheduler 221 determines that the current transmission is to back off, terminate or be delayed.

In one or more embodiments, priority-based or QoS-based control of a transmission allows one or more higher priority messages to be transmitted in lieu or instead of lower priority messages on an as-needed basis. For instance, in one or more embodiments, priority depends on content of the message, and/or other parameters, such as: message length, an amount of time since a last successful transmission. In one or more embodiments, the control module 233 determines a battery status or power supply level (e.g., low power devices generally allowed to proceed with a transmission) to determine a priority for the corresponding device. In one or more embodiments, a high or preferred priority is assigned to a new device and/or a new connection. In one or more embodiments, a higher or preferred priority is assigned to a specific type of device relative to another type of device.

In one or more embodiments, methods and systems for full-duplex operation include the aspect of sending real time feedback to a transmitting device 103. In one or more embodiments, real time feedback is leveraged to improve transmission throughput. In one or more embodiments, full-duplex allows devices to send real-time feedback, without interrupting an ongoing transmission. On the other hand, to send feedback, half-duplex devices would have to end or delay a current data transmission, switch between transmitter and receiver modes, and then transmit a feedback frame in reverse direction relative to the current data transmission, in one or more embodiments. In one or more embodiments, a full-duplex method for feedback is much more efficient than half-duplex operation, and allows for on-the-fly adjustment of transmission parameters in response to received feedback.

In one or more embodiments, information is fed back in real time from the receiving device to the transmitting device. The information includes received samples (e.g., possibly quantized, time and/or frequency-domain samples), LLRs (possibly quantized), function of LLRs and decoded bits (e.g., a receiving device computes one or more parities on decoded bits and feeds back the computed parities), and/or indices of bits that have weak LLRs, success/failure of each codeword, in one or more embodiments. In one or more embodiments, the information includes signal-to-noise ratio (SNR) or SINR (e.g., instantaneous or in real time), and possibly per tone or frequency. In one or more embodiments, the information includes channel estimation information (in time and/or frequency-domain, possibly quantized, possibly for multiple input multiple output—MIMO). In one or more embodiments, the information includes an estimate of interfering signals, e.g., interference covariance information.

In one or more embodiments, in response to the received feedback, the transmitting device 103 adjusts one or more of: MCS, code rate, code type, specific coding and/or interleaver pattern, per-tone power loading, spatial mapping matrix (e.g., a beamforming matrix), Orthogonal Frequency-Division Multiple Access (OFDMA) sub-band allocation, number of spatial streams, bandwidth, transmission power, etc. In one or more embodiments, a device 103 sends real-time feedback (e.g., for instantaneous MCS adjustment, instantaneous ACK, etc.) on a separate frequency (e.g., in FDD system). However, that approach is probably less efficient and is potentially unfeasible due to bandwidth limitation, in one or more embodiments. In one or more embodiments, some uses of real-time feedback proposed here involve feeding back large amounts of information and is reasonable if the feedback is performed on a separate frequency.

In one or more embodiments, the use of real-time feedback, such as MCS feedback, eliminates or reduces a preference for a conservative MCS, e.g., to be selected initially for a transmission. In one or more embodiments, a transmitting device 103 initially chooses or selects an aggressive MCS, e.g., with the assumption that there is little or no interference on the air. If interference arrives or appears, a device 103 receiving the transmission of the transmitting device 103 provides real-time feedback to indicate or describe the interference, in one or more embodiments. Responsive to the real-time feedback, the transmitting device 103 downgrades or reduces the MCS for the ongoing transmission (or for a retransmission) in one or more embodiments. In one or more embodiments, for example, a transmitting device 103 begins transmission at a low transmit power, and increases the transmit power if appropriate (e.g., responsive to real time feedback from the receiving device 103).

In one or more embodiments, real-time feedback is used when appropriate or worthwhile (e.g., from a power consumption or overhead perspective). For example, both sides of the full-duplex transmission link should take into account additional power consumed by the feedback link, in one or more embodiments. The system is able to enable feedback when there is a net benefit, in one or more embodiments. In one or more embodiments, one device 103 is able to inform the other if the device 103 does not want to currently use or support a feedback link. In one or more embodiments, a device 103 is able to combine (e.g. multiplex) real-time feedback with reverse-direction data to transmit to the other device 103. In one or more embodiments, a device 103 is able to combine forward-direction data with real-time feedback describing a reverse direction data link.

In one or more embodiments, such as in a device using an 802.11 or WiFi-based protocol for communications, certain changes are applied to the protocol features to support in-band full-duplex operation (e.g., between at least two devices). For example, and in one or more embodiments, a protocol change is applied to enable a device B to transmit back to a device A while device A is transmitting to device B, in full-duplex operation. In one or more embodiments, device A begins transmitting a frame to device B. Device B decodes a preamble of the A-to-B transmission, and determines a length of the corresponding A-to-B frame in one or more embodiments. If device A is full duplex capable (e.g., as communicated during capabilities exchange or handshake, e.g., at time of association of the devices), device B is allowed to start transmitting a frame to device A, in one or more embodiments. In one or more embodiments, the B-to-A frame is implemented to end no later than the time at which the A-to-B frame ends.

In one or more embodiments, the present systems and methods imposes or enforces one or more rules on the B-to-A frame. For instance, and in one or more embodiments, the B-to-A frame transmission is sent at a reduced power and/or MCS (e.g., relative to the A-to-B frame transmission). In one or more embodiments, device B is able to select or choose a MCS and/or transmit power so that the B-to-A frame transmission ends at or roughly around the same time as the end of the A-to-B transmission. In one or more embodiments, device B (e.g., in coordination with device A) is able to stretch out or extend the B-to-A frame or transmission to end at or roughly around the same time as the end of the A-to-B transmission, e.g., for improved utilization of the bandwidth or channel. In one or more embodiments, the airtime is reserved (e.g., for the full-duplex transmission, including the B-to-A frame transmission), since the A-to-B frame transmission is already underway. Thus, collision from transmissions of other devices could be avoided or prevented, in one or more embodiments. In one or more embodiments, selecting a relatively low link (or low MCS) for the B-to-A frame transmission (e.g., reducing self-interference at device A) allows device A to deactivate, or to reduce the accuracy or extent of device A's self-interference cancellation circuit.

In one or more embodiments, device A includes or incorporates information into an A-to-B preamble to indicate that a B-to-A (or reverse direction) transmission is allowed or supported (during, or at the same time as the ongoing A-to-B or forward direction transmission). In one or more embodiments, the included information, or the support for the B-to-A transmission, is subject to certain constraints (e.g., a maximum or threshold MCS for the B-to-A transmission). In one or more embodiments, device A is able to reduce the MCS of the A-to-B transmission due to, or based on device A's knowledge of device B's self-interference capability, and/or in anticipation of device B sending a simultaneous or concurrent B-to-A frame. By way of non-limiting illustration, the devices are able to coordinate communication using a bi-directional request to send (RTS)/clear to send (CTS) mechanism, in one or more embodiments. In one or more embodiments, a device 103 is able to indicate in a RTS and/or CTS message to the other device 103 that traffic is going to be sent in both directions. For instance, device A transmits a RTS message and device B responds with a message which includes a CTS and/or a RTS message (e.g., to indicate that A is clear to send, and also to request to proceed with a B-to-A transmission).

In one or more embodiments, two or more devices 103 are able to perform a full-duplex capability exchange (e.g., via their respective feedback units 232), e.g., at time of association and/or prior to data transmission. In one or more embodiments, a device 103 is able to send, broadcast or otherwise announce the device's capabilities, e.g., prior to data transmission. In one or more embodiments, the capability exchange or announcement includes one or more of: whether or not the device 103 is full duplex capable, the level of accuracy or extent of self-interference cancellation of which the device 103 is capable, a power range within which the device 103 operates or is capable of for performing full duplex operation (e.g., a threshold or floor receiver power level at which the device is capable of in performing full duplex operation), power cost to the device 103 to perform full duplex operation, a MCS threshold or limit supported by the device for receiving a frame while performing full duplex operation, or a limit to the number of spatial streams that the device 103 is capable of receiving while in full duplex operation. In one or more embodiments, the capability exchange or announcement is leveraged for situations in which data transmission in two directions are asymmetric. In one or more embodiments, the capability exchange or announcement allows balancing between devices, for example allowing a device 103 to reduce a transmission power if the device 103 is transmitting less data than the transmission in the other direction (e.g., data in the downward stream).

Figure 2D:
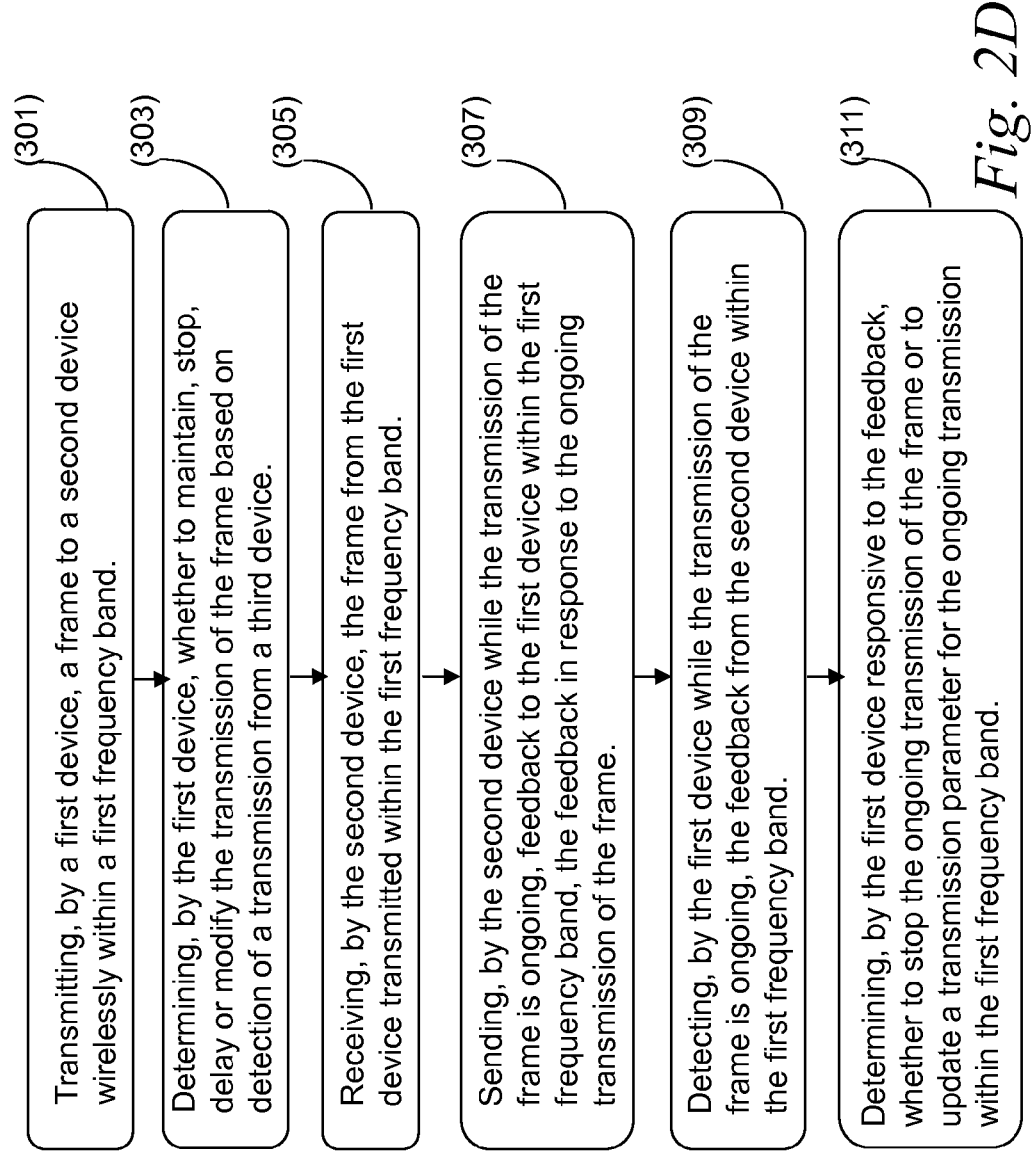
FIG. 2D is a flow diagram depicting an embodiment of process operations for in-band full-duplex operation.

Referring now to FIG. 2D, one or more embodiments of a method for LTE-U and WLAN coexistence is depicted. In one or more embodiments, the method includes transmitting, by a first device 103, a frame to a second device wirelessly within a first frequency band (operation 201). The first device 103 determines whether to maintain, stop, delay or modify the transmission of the frame based on detection of a transmission from a third device (operation 203). The second device 103 receives the frame from the first device 103 transmitted within the first frequency band (operation 205). The second device 103 sends, while the transmission of the frame is ongoing, feedback to the first device 103 within the first frequency band, the feedback in response to the ongoing transmission of the frame (operation 207). The first device 103 detects, while the transmission of the frame is ongoing, the feedback from the second device 103 within the first frequency band (operation 209). The first device 103 determines, responsive to the feedback, whether to stop the ongoing transmission of the frame or to update a transmission parameter for the ongoing transmission within the first frequency band (operation 211).

Referring now to operation 201, and in one or more embodiments, a first device 103 transmits a frame to a second device wirelessly within a first frequency band. In one or more embodiments, the first device is one of a WLAN device or a LTE device, and the second device is the other of the WLAN device or the LTE device. In one or more embodiments, both the first and the second devices 103 are of the same type (e.g., either WLAN or LTE devices). In one or more embodiments, the first and/or second devices employs a RTS/CTS mechanism to setup a bidirectional communications channel, e.g., in-band full-duplex communications. For example, the first device 103 transmits a RTS message and device B responds with a message which includes a CTS and/or a RTS message, as discussed above in connection with at least FIG. 2A. In one or more embodiments, the first and/or second devices engages in a full-duplex capability exchange (e.g., via their respective feedback units 232), for example as discussed above in connection with at least FIG. 2A. The first device 103 selects transmission parameters (e.g., MCS, transmission power) for the transmission of the frame, e.g., in response to the RTS/CTS exchange or the full-duplex capability exchange. For example, the first device 103 selects a more aggressive initial MCS for the transmission, e.g., based on the enabling of real time feedback for the full-duplex channel.

The first device 103 transmits, via a transmitter 224 of the first device, the frame in one or more embodiments. The transmission of the frame is sometimes simply referred to as a transmission. The transmitter 224 wirelessly transmits the frame to the second device 103 within a first frequency band in one or more embodiments. In one or more embodiments, the transmitter 224 transmits the frame using an 802.11 or a LTE protocol. In one or more embodiments, the first device 103 receives (e.g., via a receiver 223) a transmission from the second device 103 in accordance with the full-duplex operation, the transmission including data, control information and/or feedback (e.g., regarding the ongoing transmission). The first device 103 performs self-interference cancellation in one or more embodiments, for example as discussed above in connection with at least FIGS. 2A and 2B. In one or more embodiments, the first and/or second devices adapts their transmission configuration based on any of the techniques discussed above in connection with at least FIGS. 2A-2C.

Referring now to operation 203, and in one or more embodiments, the first device 103 determines whether to maintain, stop, delay or modify the transmission of the frame based on detection of a transmission from a third device. In one or more embodiments, a detector 222 of the first device 103 detects for a transmission from the second device 103 (e.g., for feedback) or any other devices (e.g., indicating a possible collision). In one or more embodiments, the detector 222 listens for simultaneous transmission so that the first device 103 operates or adapts according to a protocol for coexistence of different types of devices.

The detector 222 detects a transmission from another (e.g., a third) device in one or more embodiments. In one or more embodiments, the control module 233 of the first device 103 determines whether to maintain, stop, delay or modify the transmission of the frame based on, or in response to the detection. In one or more embodiments, the detector 222 detects a priority of the transmission from the other device, e.g., based on the detected transmission. The detector 222 determines the priority based on at least one or more of: content, message length, duration, a most recent transmission, or battery status associated with the transmission from the third device. The control module 233 determines whether to maintain, stop, delay or modify the transmission of the frame based at least in part on a priority of the transmission from the other device, in one or more embodiments. The control module 233 makes the determination based on the priority of the transmission from the other device relative to that of the transmission from the first device 103 in one or more embodiments.

Referring now to operation 205, and in one or more embodiments, the second device 103 receives the frame from the first device 103 transmitted within the first frequency band. The second device 103 receives (e.g., via a receiver 223 of the second device 103) the wireless transmission from the first device 103 in one or more embodiments. A detector 222 of the second device 103 processes or otherwise decodes a portion (e.g., first or initial portion) of the received transmission or frame in one or more embodiments. For example, the second device 103 detects and/or decodes the beginning of the transmission, e.g., the first 20 milliseconds of the transmission, to determine whether a successful decode has been performed. In one or more embodiments, the detector 222 decodes a preamble of the frame while the transmission is ongoing. A feedback unit 232 of the second device 103 determines or decides whether to send feedback to the first device 103, e.g., based on the decoding, in one or more embodiments.

Referring now to operation 207, and in one or more embodiments, the second device 103 generates and/or sends, while the transmission of the frame is ongoing, feedback to the first device 103 within the first frequency band. The second device 103 sends real time feedback to the first device 103 while the transmission of the frame is ongoing in one or more embodiments. In one or more embodiments, the second device 103 generates, provides, transmits and/or sends the feedback in response to the ongoing transmission of the frame, and/or any other detected transmission in the channel. For instance, in one or more embodiments, the second device 103 sends feedback in the form of a confirmation message to indicate that the receiving device is able to successfully decode the received transmission (e.g., and the absence of a collision). In one or more embodiments, a confirmation message is not sent if the second device 103 detects a collision. In one or more embodiments, the transmitter 224 of the second device is implemented to transmit the feedback (e.g., a confirmation message) using an 802.11 or a LTE protocol.

In one or more embodiments, the second device sends a confirmation message upon, or based on a successful decode of a preamble or other portion of the received transmission. In one or more embodiments, the second device sends a confirmation message upon, or based on an absence of any detected collision, or interference that affected the decoding of the transmission. In one or more embodiments, the confirmation message is not sent if the second or receiving device 103 is unable to decode the preamble (e.g., due to high interference from self-interference and/or another transmission, for instance, from a third or hidden node. In one or more embodiments, the second device sends the feedback to the first device periodically or at regular intervals while the transmission of the frame is ongoing. For example, and in one or more embodiments, the second device sends a confirmation message based on successful receipt and/or decoding of the transmission at a predetermined interval (e.g., of 1 millisecond). Alternatively, and in one or more embodiments, the feedback unit 232 of the receiving device 103 opportunistically sends a "stop/delay/hold" message (sometimes referred to as a collision message) with respect to the transmission if the receiving device 103 detects or encounters (via the detector 222) an unsuccessful decoding during the transmission.

In one or more embodiments, the second device includes or piggybacks the feedback with a transmission of data to the first device 103. In one or more embodiments, the feedback unit 232 of the second device 103 sends feedback to perform collision avoidance based on priority and/or quality of service accorded to certain packets or frames (e.g., a control message), for example as discussed above in connection with at least FIG. 2A. For instance, in one or more embodiments, the feedback unit 232 determines the priority based on content of the transmission, and/or other parameters, such as: message length, an amount of time since a last successful transmission. In one or more embodiments, the feedback unit 232 determines a battery status or power supply level (e.g., low power devices generally allowed to proceed with a transmission) to determine a priority for the corresponding device. In one or more embodiments, a high or preferred priority is assigned to a new device and/or a new connection. In one or more embodiments, a higher or preferred priority is assigned to a specific type of device relative to another type of device.

In one or more embodiments, the second device 103 sends feedback that includes a sample of the received transmission, and/or includes information based on a log likelihood ratio (LLR) or decoded bits from the received transmission. For example, the second device 103 sends feedback that includes received samples (e.g., possibly quantized, time and/or frequency-domain samples), LLRs (possibly quantized), function of LLRs and decoded bits (e.g., a receiving device computes one or more parities on decoded bits and feeds back the computed parities), and/or indices of bits that have weak LLRs, success/failure of each codeword, in one or more embodiments. In one or more embodiments, the feedback includes signal-to-noise ratio (SNR) or SINR (e.g., instantaneous or in real time), and possibly per tone or frequency. In one or more embodiments, the feedback includes channel estimation information (in time and/or frequency-domain, possibly quantized, possibly for multiple input multiple output—MIMO). In one or more embodiments, the feedback includes an estimate of interfering signals, e.g., interference covariance information. In one or more embodiments, for example when the amount of information in the feedback in substantial, the second device 103 sends feedback on a separate frequency or frequency band, e.g., other than the first frequency band.

In one or more embodiments, a detector 222 of the second device 103 detects, while the transmission is ongoing, a transmission from a another (e.g., a third) device within the first frequency band. The second device sends the feedback (e.g., a collision message) based on the detected transmission from another device, for example as discussed above in connection with at least FIG. 2A. In one or more embodiments, the second device 103 sends the feedback which includes a message transmitted to one or more devices, the message identifying, instructing or requesting at least one of the one or more devices to stop, halt or postpone transmission. In one or more embodiments, the second device 103 sends the message based on a determination of a priority of the transmission from the other device, e.g., relative to a priority of the transmission from the first device. For instance, and in one or more embodiments, the message instructs the first device 103 or the other device to stop the corresponding transmission, based on which transmission has a higher priority, such that the lower priority transmission should back off. For example, and in one or more embodiments, the collision message specifies or identifies the device(s) that are to end/postpone/delay/hold transmission, to allow one transmission, such as a transmission with the most power or priority, to continue or proceed without interference.

Referring now to operation 209, and in one or more embodiments, the first device 103 detects, while the transmission of the frame is ongoing, the feedback from the second device 103 within the first frequency band. A receiver 223 of the first device 103 receives the feedback in one or more embodiments. The detector 222 of the first device 103 detects, while the transmission of the frame is ongoing, the feedback from the second device in one or more embodiments. The detector 222 detects that the feedback is in response to the ongoing transmission of the frame, or in response to a collision, in one or more embodiments. The detector detects or otherwise determines that the feedback includes at least a sample of the transmission, or includes information based on a LLR or decoded bits from the transmission, as discussed above and also in connection with at least FIG. 2A.

Referring now to operation 211, and in one or more embodiments, the first device 103 determines, responsive to the feedback, whether to stop the ongoing transmission of the frame or to update a transmission parameter for the ongoing transmission within the first frequency band. A control module 233 of the first device determines, responsive to the feedback, whether to modify or suspend the ongoing transmission of the frame within the first frequency band, in one or more embodiments. In one or more embodiments, the control module 233 is implemented to determine whether to update one or more parameters for the transmission responsive to the received feedback. In one or more embodiments, the control module 233 updates at least one or more of a MCS, code rate, code type (e.g., specific coding and/or interleaver pattern), power (e.g. per-tone power loading), beamforming configuration (e.g., spatial mapping matrix, beamforming matric), number of spatial streams, bandwidth, or OFDMA sub-band allocation of the transmission, responsive to the feedback and the determination, for example as discussed above in connection with at least FIG. 2A.

By way of illustration, and in one or more embodiments, the first device 103 initially chooses or selects an aggressive MCS, e.g., with the assumption that there is little or no interference on the air. If interference arrives or appears, the second device 103 provides real-time feedback to indicate or describe the interference, in one or more embodiments. Responsive to the real-time feedback, the first device 103 downgrades or reduces the MCS for the ongoing transmission (or for a retransmission) in one or more embodiments. In one or more embodiments, for example, the first device 103 begins transmission at a low transmit power, and increases the transmit power responsive to real time feedback from the second device 103.

In one or more embodiments, the control module 233 determines to stop, delay or modify the transmission of the frame based on detection (by the first and/or second device) of a transmission from another (e.g., a third) device. In one or more embodiments, the feedback includes an instruction to the control module 233 to stop, delay or modify the transmission of the frame based on detection. In one or more embodiments, the control module 233 determines whether to maintain, stop, delay or modify the transmission of the frame based on a priority of a detected transmission from the other device. In one or more embodiments, the feedback includes an indication of the priority of the detected transmission from the other device. In one or more embodiments, the priority is based on at least one or more of: content, message length, or duration of the transmission of the other device, a most recent transmission of the other device if any (e.g., if this is a first transmission from the other device, or if the other device has recently transmitted a frame successfully or attempted to do so unsuccessfully), or a battery status or remaining power level associated with the transmission from the other device.

In one or more embodiments, the first device updates, for the ongoing transmission, at least one or more of the MCS, transmission code rate, transmission code type (e.g., modulation scheme), transmission power, beamforming configuration, number of spatial streams used, bandwidth allocation or use, or sub-band allocation, responsive to the feedback. In one or more embodiments, the first device 103 stops or postpones the transmission. In one or more embodiments, the first device 103 identifies, selects or assigns, for a postponed transmission, a postponed transmission of a remainder of the frame (e.g., the untransmitted portion of the frame), or for a retransmission of the frame, a MCS, transmission code rate, transmission code type, transmission power, beamforming configuration, number of spatial streams used, bandwidth allocation or use, or sub-band allocation, responsive to the feedback.

Although the disclosure might reference one or more "users", such "users" can refer to user-associated devices, for example, consistent with the terms "user" and "multi-user" typically used in the context of a MU-MIMO environment. Although examples of communications systems described above sometimes describe devices and/or access points operating according to an IEEE 802.11, 3GPP or LTE standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, frames, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for in-band full-duplex operation, the method comprising:
    transmitting, by a first device, a frame to a second device wirelessly within a first frequency band;
    detecting, by the first device while the transmission of the frame is ongoing, feedback from the second device within the first frequency band, the feedback in response to the ongoing transmission of the frame; and
    determining, by the first device responsive to the feedback, whether to stop the ongoing transmission of the frame or to update a transmission parameter for the ongoing transmission within the first frequency band.

2. The method of claim 1, wherein the transmission of the frame and transmission of the feedback both use an 802.11 or a long term evolution (LTE) protocol.

3. The method of claim 1, further comprising detecting, by the first device, a transmission from a third device, and determining to stop, delay or modify the transmission of the frame based on the detection of the transmission from the third device.

4. The method of claim 1, further comprising detecting, by the first device, a transmission from a third device, and determining whether to maintain, stop, delay or modify the transmission of the frame based on a priority of the transmission from the third device.

5. The method of claim 4, further comprising determining, by the first device, the priority based on at least one or more of: content, message length, duration, a most recent transmission, or battery status associated with the transmission from the third device.

6. The method of claim 1, wherein the feedback comprises a sample of the transmission, or comprises information based on a log likelihood ratio (LLR) or decoded bits from the transmission.

7. The method of claim 1, further comprising updating, by the first device, at least one or more of a modulation and coding scheme (MCS), code rate, code type, power, beamforming configuration, number of spatial streams, bandwidth, or sub-band allocation of the transmission responsive to the feedback.

8. A method for in-band full-duplex operation, the method comprising:
receiving, by a first device, a frame from a second device transmitted wirelessly within a first frequency band;
sending, by the first device while the transmission of the frame is ongoing, feedback to the second device within the first frequency band, the feedback in response to the ongoing transmission of the frame,
wherein the feedback comprises information indicating whether to stop the ongoing transmission of the frame or to update a transmission parameter for the ongoing transmission within the first frequency band.

9. The method of claim 8, comprises detecting, while the transmission is ongoing, a transmission from a third device within the first frequency band, and sending the feedback based on the detected transmission from the third device.

10. The method of claim 8, wherein the first device is one of a wireless local area network (WLAN) device or a long term evolution (LTE) device, and the second device is the other of the WLAN device or the LTE device.

11. The method of claim 8, comprises decoding a preamble of the frame while the transmission is ongoing, and determining whether to send the feedback based on the decoding.

12. The method of claim 8, comprising sending, by the first device, feedback to the second device at regular intervals while the transmission of the frame is ongoing.

13. The method of claim 8, wherein the feedback comprises a message transmitted to one or more devices, the message identifying at least one of the one or more devices to stop transmission.

14. A system for in-band full-duplex operation, the system comprising:
a transmitter of a first device, the transmitter configured to wirelessly transmit a frame to a second device within a first frequency band;
a detector of the first device, the detector configured to detect, while the transmission of the frame is ongoing, feedback from the second device within the first frequency band, the feedback in response to the ongoing transmission of the frame; and
a control module of the first device, the control module configured to determine, responsive to the feedback, whether to modify or suspend the ongoing transmission of the frame within the first frequency band.

15. The system of claim 14, wherein the transmitter is configured to transmit the frame using an 802.11 or a long term evolution (LTE) protocol.

16. The system of claim 14, wherein the control module is configured to stop, delay or modify the transmission of the frame based on detection of a transmission from a third device.

17. The system of claim 14, wherein the control module is configured to determine whether to maintain, stop, delay or modify the transmission of the frame based on a priority of a detected transmission from a third device.

18. The system of claim 17, wherein the detector is configured to determine the priority based on at least one or more of: content, message length, duration, a most recent transmission of the third device, or battery status associated with the transmission from the third device.

19. The system of claim 14, wherein the detector is configured to detect that the feedback comprises a sample of the transmission, or comprises information based on a log likelihood ratio (LLR) or decoded bits from the transmission.

20. The system of claim 14, wherein the control module is configured to update at least one or more of a modulation and coding scheme (MCS), code rate, code type, power, beamforming configuration, number of spatial streams, bandwidth, or sub-band allocation of the transmission responsive to the feedback.

* * * * *